No. 718,512. PATENTED JAN. 13, 1903.
F. R. PACKHAM.
GRAIN DRILL.
APPLICATION FILED JUNE 24, 1902.
NO MODEL. 3 SHEETS—SHEET 1.
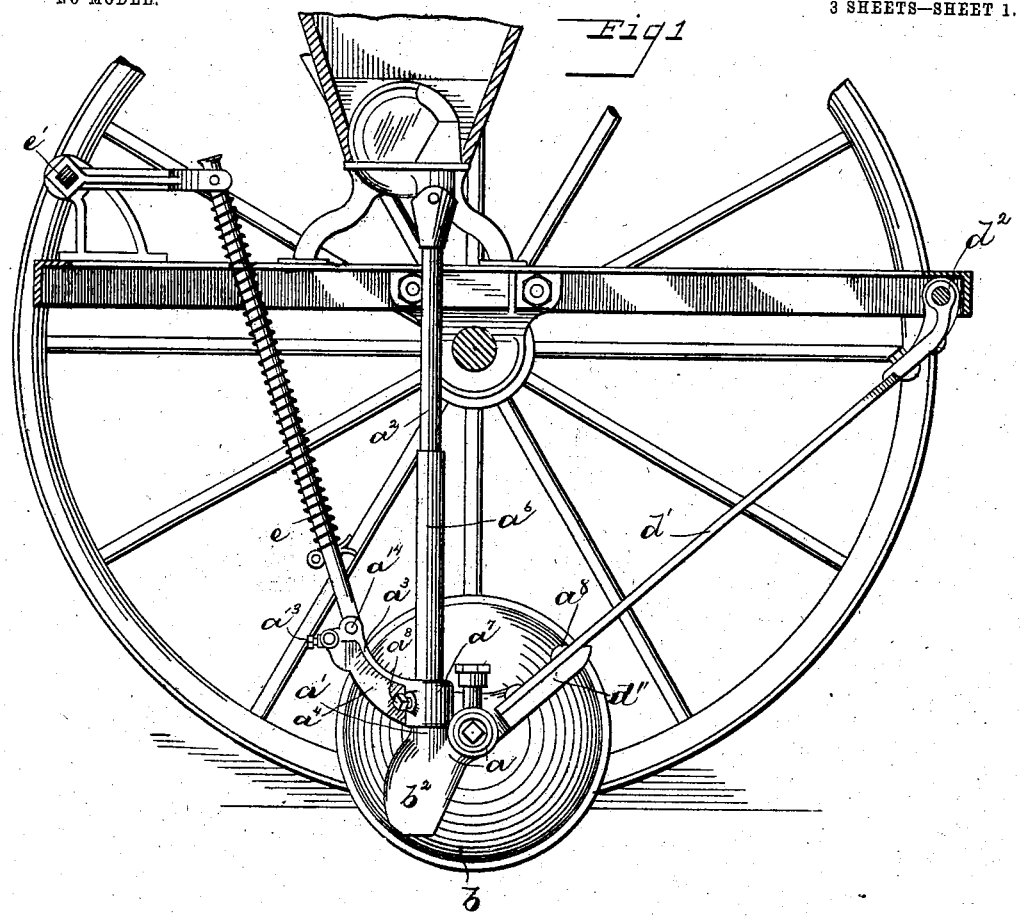

No. 718,512. PATENTED JAN. 13, 1903.
F. R. PACKHAM.
GRAIN DRILL.
APPLICATION FILED JUNE 24, 1902.
NO MODEL. 3 SHEETS—SHEET 2.
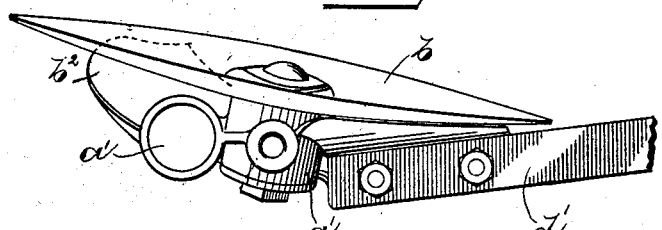
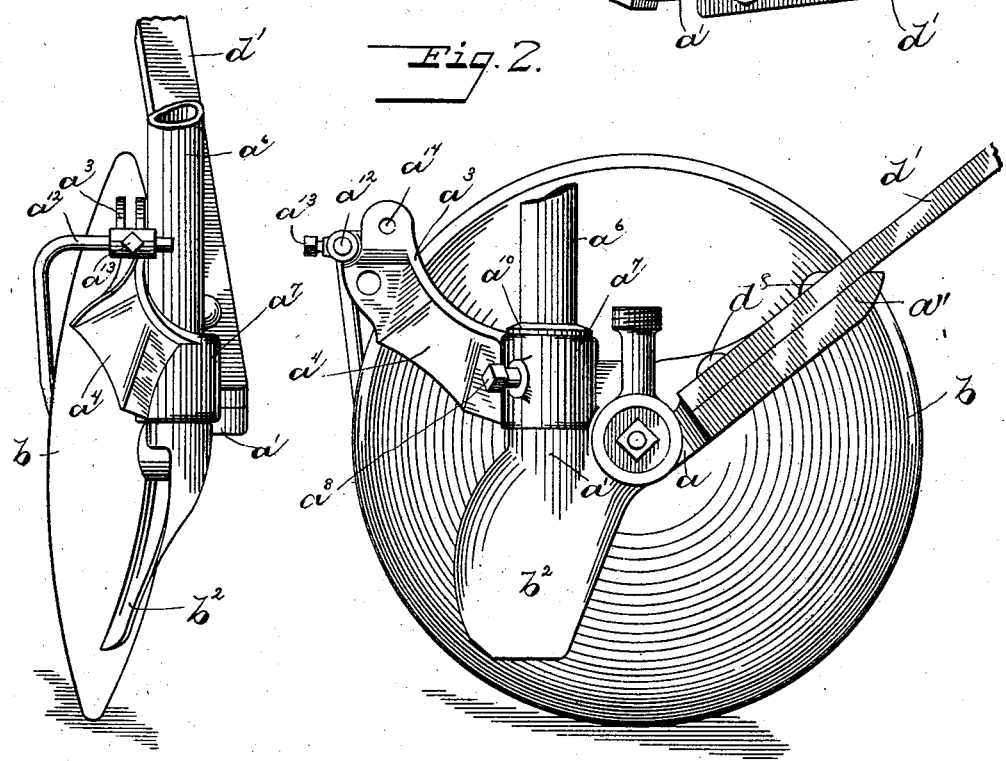

No. 718,512. PATENTED JAN. 13, 1903.
F. R. PACKHAM.
GRAIN DRILL.
APPLICATION FILED JUNE 24, 1902.
NO MODEL. 3 SHEETS—SHEET 3.

WITNESSES:

INVENTOR.
Frank R. Packham
BY
ATTORNEYS

UNITED STATES PATENT OFFICE.

FRANK R. PACKHAM, OF SPRINGFIELD, OHIO, ASSIGNOR TO THE SUPERIOR DRILL COMPANY, OF SPRINGFIELD, OHIO, A CORPORATION OF OHIO.

GRAIN-DRILL.

SPECIFICATION forming part of Letters Patent No. 718,512, dated January 13, 1903.

Application filed June 24, 1902. Serial No. 113,044. (No model.)

*To all whom it may concern:*

Be it known that I, FRANK R. PACKHAM, a citizen of the United States, residing at Springfield, in the county of Clark and State of Ohio, have invented certain new and useful Improvements in Grain-Drills, of which the following is a specification.

My invention relates to furrow-openers for seeding implements, and more particularly to that class of implements where the trench or furrow for the reception of the seed is opened by a disk.

The object of my invention is to improve the construction of the disk-carrying frame, the grain-conduit, and connections with the hopper, as well as the shield which protects and guides the grain into the furrow.

A further object is to provide means adapted to my present construction for freeing the disk of clinging soil.

My invention consists in the constructions and combinations hereinafter described, and set forth in the claims.

Figure 5:
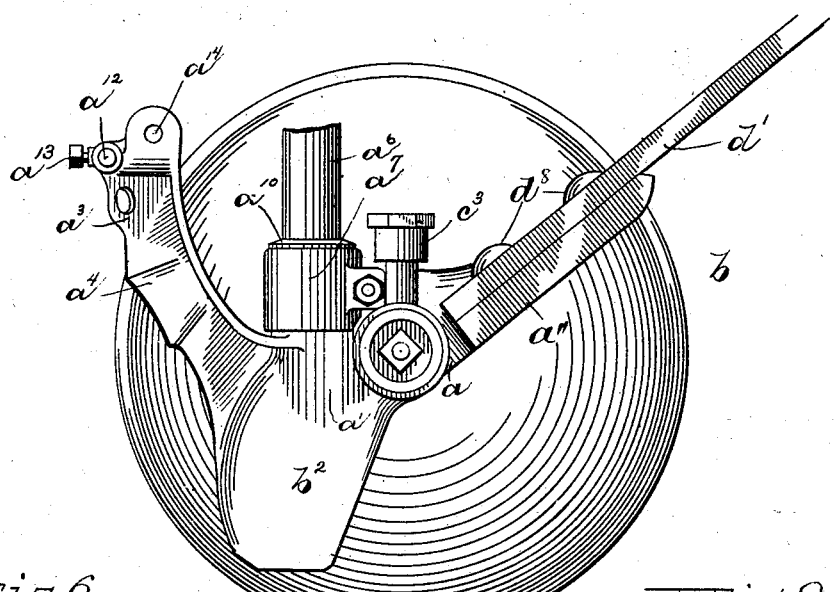
Figure 6:
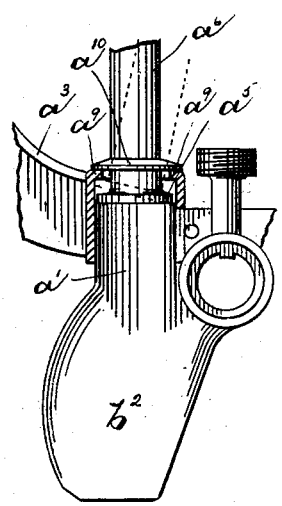
Figure 7:
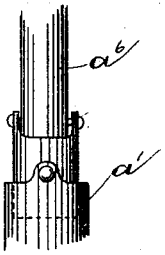
Figure 9:
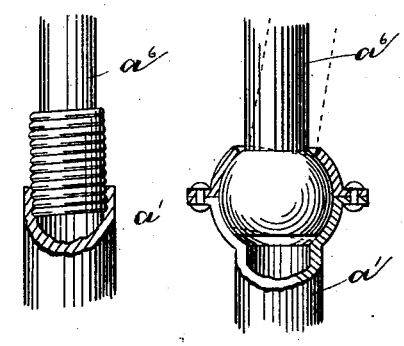
Figure 8:
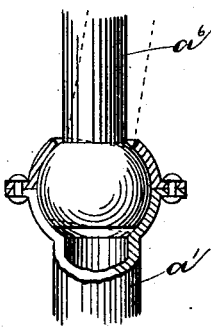

In the accompanying drawings, Figure 1 is a side view of a portion of a grain-drill embodying my invention. Fig. 2 is a side view of a disk with my improvements thereon. Fig. 3 is a top view, and Fig. 4 an end view, of same. Fig. 5 is a modification showing the peripheral cleaner formed integrally with the shield and seed-conduit cap separate therefrom. Fig. 6 is a detail, partly in section, of a universal-joint connection with said conduit. Figs. 7, 8, and 9 are modifications of same.

Like parts are represented by similar letters of reference in the several views.

In constructing my improved furrow-opener I employ a frame or support $a$ to carry a furrow-opening disk $b$, said disk being carried at an angle to the line of draft, and I provide an upwardly-extending portion $a'$, preferably cylindrical in form, to receive the grain, together with a downwardly-projecting shield $b^2$, adapted to lie adjacent to the convex surface of the disk, inclined to the rear of its axial center to protect and guide the grain into the furrow, said cylinder and shield being, preferably, formed integrally with the frame or support.

The wear on the front edge of the shield, which lies adjacent to the disk, caused by gritty substances impinging between it and the disk, greatly diminishes the efficiency of the shield, and to obviate this without employing devices to reset the shield I preferably cast the shield and the parts formed therewith of malleable metal, so that when the edge of the shield becomes worn, leaving a space between it and the disk, the space can be quickly closed by hammering the edge of the shield back into position adjacent to the disk. This may be quickly and easily done by the operator and it will immediately restore the efficiency of the shield.

After much practical experience in the fields of many States I have found when the shield extends down substantially to the outer periphery of the disk that the wet stubbles which are frequently encountered in the early spring will tuck, bend, and adhere to the bottom of the shield, and to avoid this I preferably form the shield so as to leave a space—say an inch or an inch and a half wide—adjacent to the periphery of the disk with which the shield does not contact or lie adjacent to. This in no manner reduces its efficiency in protecting the falling grain, as the shield will still extend into the furrow to a normal seeding depth. I have found when the shield is so formed that it does not extend and lie adjacent to the disk to its periphery the rotation of the disk will to a considerable extent carry up small balls of soft earth, which when the seed conduit is open at this point tend to collapse the rubber seed-tubes extending into the conduit, reduce their area, and prevent the grain from properly reaching the furrow. This difficulty I effectually overcome by providing an upwardly and rearwardly extending portion $a^3$, having a cleaner $a^4$ formed thereon to contact with and clean that portion of the convex face of the disk adjacent to the periphery not cleaned by the shield. It will be seen that as the cleaner $a^4$ is above the axial center of the disk the adhering mud will be scraped off and drop over the seed in the furrow and assist in covering the seed and filling the furrow.

The free operation of the disk under the varying angular changes incident to its rise and fall and the necessity of delivering the grain close to the face of the disk has given considerable trouble to properly deliver the grain to the grain-conduit of the disk-support. Heretofore the grain-conduits of the disk-supports have been usually formed integrally with the supports extended high up and with liberal dimensions to permit the telescoping conducting-spouts to operate without cramping. This construction required a heavy cumbersome casting, and even this did not in all cases avoid the difficulty of the telescoping spouts contacting and interfering with the free operation of the disk upon its rise and fall over uneven ground or obstructions. Another difficulty has been the carrying up by the disk of adhering mud that would interfere with the operation of the telescoping spouts, as hereinbefore described. To overcome these difficulties and avoid the heavy casting of the old construction, I make the grain-conduit $a'$ short in its extended portion, to which any suitable universal-joint connection may be made with the seed-conductor from the hopper. Preferably I form this universal joint by providing a flange $a^5$ at the lower edge of the seed-conductor $a^6$ to rest on top of the conduit portion $a'$ of the frame, and I further provide a cap $a^7$ for said conduit portion, which I have shown attached to same by a screw $a^8$ in such manner that inwardly-extending flanges $a^9$ of the cap form a chamber to confine the flange $a^5$, and yet allow sufficient play to the seed-conductor, as more particularly shown by the dotted lines in Fig. 6, to compensate for the rise and fall of the disk-frame. In Figs. 7, 8, and 9 I have shown other forms of universal joints; but I do not wish to confine myself to any particular form, as any well-known form will answer, although the one I have described and shown in Fig. 6 is the preferred form. I further provide a washer or head-cup $a^{10}$ over the cap $a^7$, which slides on the conductor $a^6$ to protect the universal joint from foreign substances.

The seed-conductor tube $a^2$, leading from the grain-distributer of the hopper, I telescope into the lower section $a^6$ of the tube, and thereby form a closed conduit from the hopper to the furrow, that will automatically adjust itself to the rise and fall of the furrow-opener, and the telescoping portion will not at any time extend beyond the axial center of the disk, which is very objectionable in all previous devices. The conductors $a^2$ and $a^6$ I preferably form of non-collapsible material, preferably thin metal, which in connection with the universal joint, as described, the use of which enables me to shorten the seed-receiving conduit $a'$, makes a saving in weight alone of some forty pounds in an ordinary-sized drill. It will thus be seen that in addition to its increased efficiency the improvement is of great economy in manufacture.

The cap $a^7$ is preferably formed integrally with the rearwardly-extending portion $a^3$ and becomes the means of attaching said portion to the disk-frame, as shown in Figs. 1 and 2; but I may modify this construction, as shown in Fig. 5, wherein I have shown the portion $a^3$ formed integrally with the disk-frame and shield and the cap $a^7$ independent thereof.

I provide the disk-frame with an extension $a^{11}$, to which I secure the lower end of the drag-bar $d'$ by rivets $d^8$, but it may be secured in any suitable manner, and said bar is pivoted at $d^2$ to the main frame of the machine. On the rearwardly-extending part $a^3$ I provide a perforation with a set-screw $a^{13}$ to secure the shank $a^{12}$ of a scraper to operate on the concave side of the disk, and I further provide an opening $a^{14}$, to which I pivot a pressure-spring rod $e$, operated by a rock-shaft $e'$ and a hand-lever on said shaft.

Having thus described my invention, I claim—

1. In a disk drill, the combination of a support having a grain-conduit, a furrow-opening disk journaled on said support, a grain-conductor and a universal joint connecting said conduit and conductor, substantially as specified.

2. In a disk drill, the combination of a support having a grain-conduit, a furrow-opening disk journaled on said frame, a non-collapsible telescoping grain-conductor and a universal joint connecting said conductor with the conduit in said frame, substantially as specified.

3. In a disk drill, the combination of a support, a disk journaled at an angle to the line of draft to said support, said support having a grain-conduit and a shield extending below and in front of said conduit and adjacent to said disk, a grain-conductor, and interengaging parts forming a universal joint connecting said conduit and conductor, substantially as and for the purpose specified.

4. In a disk drill, the combination of a support, a disk journaled at an angle to the line of draft to said support, said support having a grain-conduit and a shield extending below and in front of said conduit, said conduit and shield being formed of malleable material integrally with said support, a grain-conductor, interengaging parts forming a universal joint connecting said conduit and conductor, substantially as and for the purpose specified.

5. In a disk drill, the combination of a support, a disk journaled at an angle to the line of draft to said support, said support having a grain-conduit and a shield extending below and in front of said conduit adjacent to said disk, a hopper and a closed telescoping grain-conductor leading therefrom, interengaging parts forming a universal joint connecting said conduit and conductor, substantially as and for the purpose specified.

6. In a disk drill, the combination of a support, a disk journaled at an angle to the line of draft to said support, said support having a grain-conduit and a shield extending below and in front of said conduit adjacent to said disk, a hopper and a closed telescoping grain-conductor leading therefrom, the lower end of said conductor having a flexible closed connection with said conduit, substantially as and for the purpose specified.

7. The combination of a support having a grain-conduit and a shield, a furrow-opening disk journaled at an angle to said support, said shield extending below and in front of said conduit, the front portion of said shield adapted to conform with and lie adjacent to the face of said disk from its axial center to a point removed from its periphery, a cleaner carried by said support to contact with that portion of said disk to which said shield does not lie adjacent, a non-collapsible telescoping grain-conductor, and a universal joint connecting said conductor with said conduit, substantially as specified.

8. In a disk drill, the combination of a support, a disk journaled at an angle to the line of draft to said support, said support being formed with a grain-conduit in its upper portion and having a shield extending below and in front of said conduit, its front portion adapted to conform with and lie adjacent to the face of said disk to a point removed from its periphery, and a cleaner adapted to contact with and clean that portion of the disk to which said shield does not lie adjacent, a grain-conductor having a flange adapted to rest on said support about said grain-conduit, and a cap attached to said support, extended over said conductor-flange, adapted to form a loose connection, permitting a lateral and longitudinal movement of said conductor, substantially as specified.

9. In a seeding implement having independent disk furrow-openers consisting of a support having a grain-conduit and a shield, and a furrow-opening disk journaled at an angle to said support, said shield extending below and in front of said conduit, the front portion of said shield adapted to conform with and lie adjacent to the face of said disk from its axial center to a point removed from its periphery, a rearwardly-extending arm from said support having a cleaner adapted to contact with that portion of the disk to which said shield does not lie adjacent, said arm being also adapted to carry a scraper for the opposite side of said disk, substantially as specified.

In testimony whereof I have hereunto set my hand this 20th day of June, A. D. 1902.

FRANK R. PACKHAM.

Witnesses:
PERCY NORTON,
OLIVER H. MILLER.